(12) United States Patent
Best et al.

(10) Patent No.: US 7,171,679 B2
(45) Date of Patent: Jan. 30, 2007

(54) GENERATING AND MAINTAINING ENCRYPTED PASSWORDS

(75) Inventors: Steven Francis Best, Georgetown, TX (US); Michael Richard Cooper, Austin, TX (US); James Lee Gray, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 10/042,038

(22) Filed: Jan. 7, 2002

(65) Prior Publication Data

US 2003/0131266 A1    Jul. 10, 2003

(51) Int. Cl.
*H04L 9/00* (2006.01)
*H04L 9/32* (2006.01)

(52) U.S. Cl. ............................. 726/4; 726/28; 726/30; 380/44

(58) Field of Classification Search ............... 340/5.54, 340/8.85; 379/903; 700/237; 705/18; 711/164; 713/183, 184, 202; 725/30
See application file for complete search history.

(56) References Cited

U.S. PATENT DOCUMENTS

| 5,754,659 | A | * | 5/1998 | Sprunk et al. ................. 380/30 |
| 5,812,764 | A | * | 9/1998 | Heinz, Sr. ..................... 713/202 |
| 5,892,828 | A | | 4/1999 | Perlman |
| 5,987,454 | A | | 11/1999 | Hobbs |
| 6,006,333 | A | * | 12/1999 | Nielsen ....................... 713/202 |
| 6,038,597 | A | | 3/2000 | Van Wyngarden |
| 6,131,164 | A | | 10/2000 | Parker |
| 6,141,760 | A | * | 10/2000 | Abadi et al. .................. 726/14 |
| 6,182,220 | B1 | | 1/2001 | Chen et al. |
| 2001/0009583 | A1 | * | 7/2001 | Murakami ................... 380/278 |
| 2002/0087890 | A1 | * | 7/2002 | Chan et al. ................. 713/202 |
| 2003/0041251 | A1 | * | 2/2003 | Kumhyr ..................... 713/184 |
| 2004/0078775 | A1 | * | 4/2004 | Chow et al. ................ 717/100 |

FOREIGN PATENT DOCUMENTS

EP    0304891 A2    8/1988

OTHER PUBLICATIONS

SSH, The Secure Shell: The Definitive Guide; Daniel J. Barret & Richard Silverman; O'Reilly Books, 1st Ed. Jan. 2001; Section 3.9.*
AR IBM Docket AUS920010598US1, PDA Password Management Tool, 31 pages, Steven Francs Best, et al.
"Think Outside Announces the First Plug-andPlay Keyboard Solution for the New HP Jornada 560 PDS Series; Stowaway Keyboard Driver Bundled as Part of the Included Software", Sep. 6, 2001, Business Wire, pp. 1-4.

* cited by examiner

*Primary Examiner*—Gilberto Barron, Jr.
*Assistant Examiner*—Virgil Herring
(74) *Attorney, Agent, or Firm*—Duke W. Yee; Marilyn Smith Dawkins; Catherine K. Kinslow

(57) ABSTRACT

A system, method and program of the invention provides an application program tool that generates a password for a user to access a resource. The tool receives as input from a user a global user password and at least one hash key. The tool applies a consistent algorithm to the name of the resource being accessed, such as a domain name for an Internet site, and the hash key, and the global user password to generate the password. The same password is regenerated the next time the user accesses the same resource. The tool automatically populates the resource with the password.

9 Claims, 5 Drawing Sheets

GENERATING AND MAINTAINING ENCRYPTED PASSWORDS

CROSS REFERENCE TO RELATED APPLICATIONS

PDA PASSWORD MANAGEMENT TOOL, Ser. No. 10/042,095, filed even date herewith, and commonly assigned, is hereby incorporated by reference.

BACKGROUND OF THE INVENTION

1. Field of the Invention

This invention relates to data processing, and in particular, to generating and maintaining passwords. Still more particularly, the present invention provides a method, system, and program for automatically generating a separate distinct password for each user and for each resource, and for regenerating that same password each time that same password is needed by that user for that resource.

2. Description of the Related Art

The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

Each computer connected to the Internet has an IP address which is used by other computers for contacting each other. The IP addresses are resolved by a Domain Name Server so that the addresses used by users may be comprised of English words, referred to as domain names, instead of numbers. For efficiency purposes, the Internet has been organized into a number of major domains including .com (commercial); .edu (education); .gov (government); mil (military); net (companies and groups concerned with the organization of the Internet); and .org (organizations). Domains are organized in an hierarchical manner. Underneath the major domains are many minor domains. By design, each Web site has a unique domain name.

Some Web sites require the user to have a password before allowing the user access to the Web site and the pages within the Web site. Because of the numerous Web sites requiring passwords, this can become burdensome to a user. Although some users try to use the same password for each Web site, some Web sites have different format requirements for the password which forces the user to have to maintain different passwords for each site. Also, over time, passwords expire. At any given time, this may require the user to come up with a new password for the Web site where the old password expired, while still maintaining the old password on those sites for which the old password has not expired. Consequently, the user is forced into maintaining separate passwords for different Web sites.

Some users write down all of their user IDs and passwords in case they are forgotten. However, this creates a security risk if the paper on which the user IDs and passwords is lost or stolen. Other users may simply forget their passwords, placing a burden on support personnel who must answer support calls and repeatedly change passwords for users.

Other users may utilize a password management tool that automatically accesses a database that contains the passwords for each secure resource. Depending on the number of resources and passwords, this may require more memory than what is available if a mobile device is used for storing passwords as described in co-pending U.S. patent application Ser. No. 10/042,095. If a mobile device is not used for storing the user's passwords, then the user's use of the database may be limited to the times in which the user is accessing the resources from the computer on which the database resides. Otherwise, the user would need to access the database over a network. Nevertheless, the user still has the burden of updating the database when passwords expire, or adding passwords when new resources are accessed. Furthermore, the password security may be compromised if the database is ever broken into.

Other users may utilize a password tool that automatically generates a random password to be used by the user. The problem with this is that the user would not get the same password the next time that the user accessed that same resource. A further problem is that the user would then have to remember the generated password.

SUMMARY OF THE INVENTION

It is therefore an object of the invention to enable, for any given user, a unique password to be automatically generated for any given Web site as the Web site is being accessed by that user.

It is a further object of the invention to automatically regenerate the same password for the user at the time when the user revisits the Web site without recalling the password from storage.

It is a further object of the invention to minimize the amount of data required to be stored for password maintenance.

It is a further object of the invention to cycle through a set of generated passwords when a previous password expires.

The system, method and program of the invention provides an application program tool that generates a password for a user to access a resource. The tool receives as input from a user a global user password and at least one hash key. The tool applies a consistent algorithm to the hash key, the global user password, and the name of the resource being accessed, such as a domain name for an Internet site, to generate the password. The same password is regenerated the next time the user accesses the same resource. The tool automatically populates the resource with the password.

In a preferred embodiment of the invention, the user inputs a set of hash keys. The hash keys are sequenced so that a first hash key is used in generating and regenerating the password until the password expires. The next hash key in the set is used to generate a new password for access to the same resource by the user. As each password expires, the next hash key, the resource name, and the global user password are used to generate a renewed password. Upon subsequent password renewals, the set of sequenced hash keys are reused from the beginning if the number of password expirations equals the number of hash keys in the set.

As such, a group of generated passwords are reused over time for a same resource and a same user as previously used passwords expire for that resource and user.

An advantage of the invention includes enabling the user to remember a single password for gaining access to the tool which generates the passwords for each secure resource. A further advantage of the invention is realized by the user because it is the user that is providing the set of global keys, i.e., hash values, that are used in generating a set of unique passwords. As such, the user can utilize any machine running this tool and have access to the same network resources using the same password that would have been generated on the user's previous machine. No new set of passwords are needed when the user utilizes a different machine. The user does not have to remember or keep track of a different password or different global keys just because the user is using a different machine.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

The present invention is carried out solely within a client system. The client system may be any one of a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figures 1, 6:
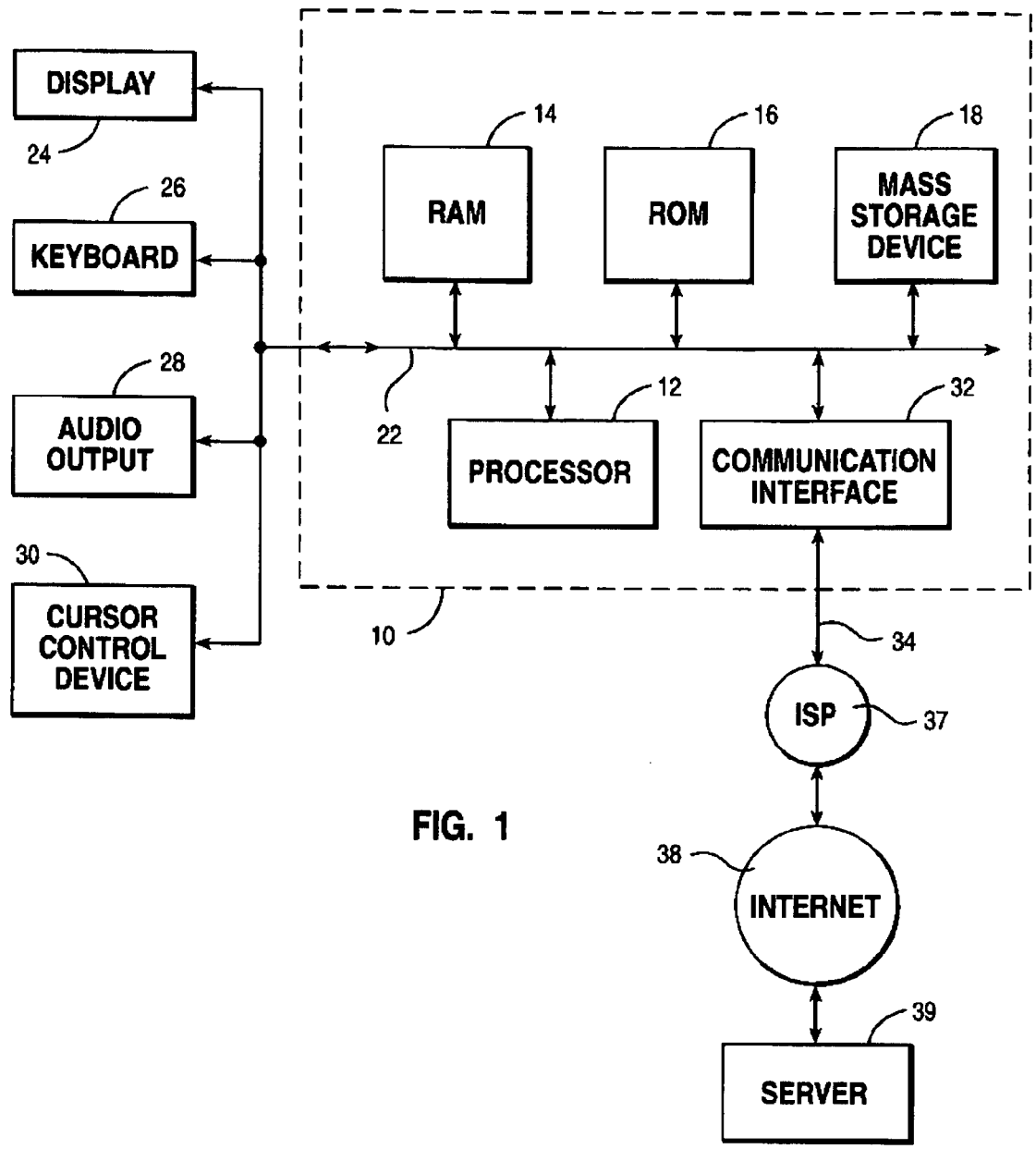
FIG. 1 depicts one embodiment of a computer system with which the method, system, and program of the present invention may be advantageously utilized.
FIG. 6 illustrates a database for tracking password generation iterations and format requirements for a resource.

Referring now to the drawings, and in particular to FIG. 1, there is depicted one embodiment of a computer system with which the method, system, and program of the present invention may be advantageously utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as a random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowchart described herein. Alternatively, the steps of the present invention might be performed by specific hardware components that contain hardwire logic for performing the steps, or by any combination of programmed computer components and custom hardware components.

Further, multiple peripheral components may be added to computer system 10. For example, a display 24 is also attached to bus 22 for providing visual, tactile or other graphical representation formats. Audio output through a speaker or other audio projection device may be controlled by audio output device 28 attached to bus 22. A keyboard 26 and cursor control device 30, such as a mouse, track ball, or cursor direction keys, are coupled to bus 22 as interfaces for user inputs to computer system 10. It should be understood that keyboard 26 and cursor control device 30 are examples of multiple types of input devices that may be utilized in the present invention. In alternate embodiments of the present invention, additional input and output peripheral components may be added.

The present invention may be provided as a computer program product, included on a machine-usable medium having stored thereon the machine executable, i.e., readable, instructions used to program computer system 10 to perform a process according to the present invention. The term "machine-usable-medium" as used herein includes any medium that participates in providing instructions to processor 12 or other components of computer system 10 for execution. Such a medium may take many forms including, but not limited to, nonvolatile media and volatile media. Common forms of nonvolatile media include, example, a floppy disk, flexible disk, hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), flash memory, any other memory chip or cartridge, or any other medium from which computer system 10 can read and which is suitable storing instructions. In the present embodiment, an example of nonvolatile media is storage device 18.

Volatile media includes dynamic memory such as RAM 14.

Moreover, the present invention may be downloaded as a computer program product, wherein the program instructions may be transferred from a remote computer such as server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide are network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communications interface 32, which carry the digital or analog data to and from computer system 10, are exemplary forms of carrier waves transporting the information.

Figure 2:
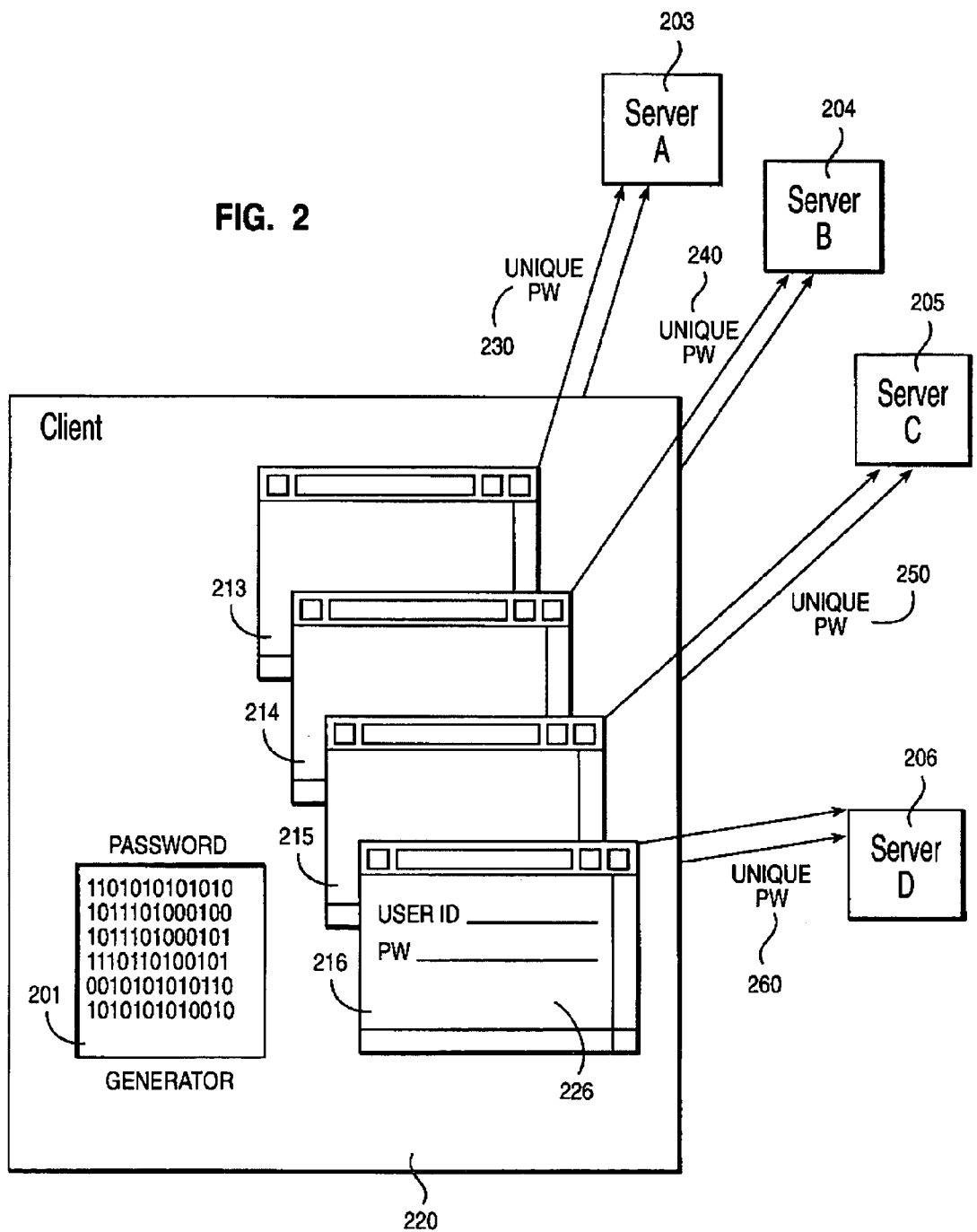
FIG. 2 is a block diagram illustrating the generation of passwords in accordance with a preferred embodiment of the invention.

With reference to FIG. 2, the system, method and program of the present invention generates and maintains encrypted passwords. A preferred embodiment of the invention is an application programming tool 201 running on a client 220 which generates different passwords 230, 240, 250, 260 for a user that are needed for the different Internet sites visited by the user which require a password; or for any resource, such as another application program such as Lotus Notes, which requires a password. Windows 213, 214, 215, 216 display the Internet sites from servers 203, 204, 205, 206, respectively. Although FIG. 2 illustrates that the Internet sites or resources are located on separate servers 203, 204, 205, 206, one or more of the resources could be located on the same server. It should be noted that in a preferred embodiment of the invention, the resources have a user interface, such as user interface 226, for querying the user for a user ID and a password.

Figure 3:
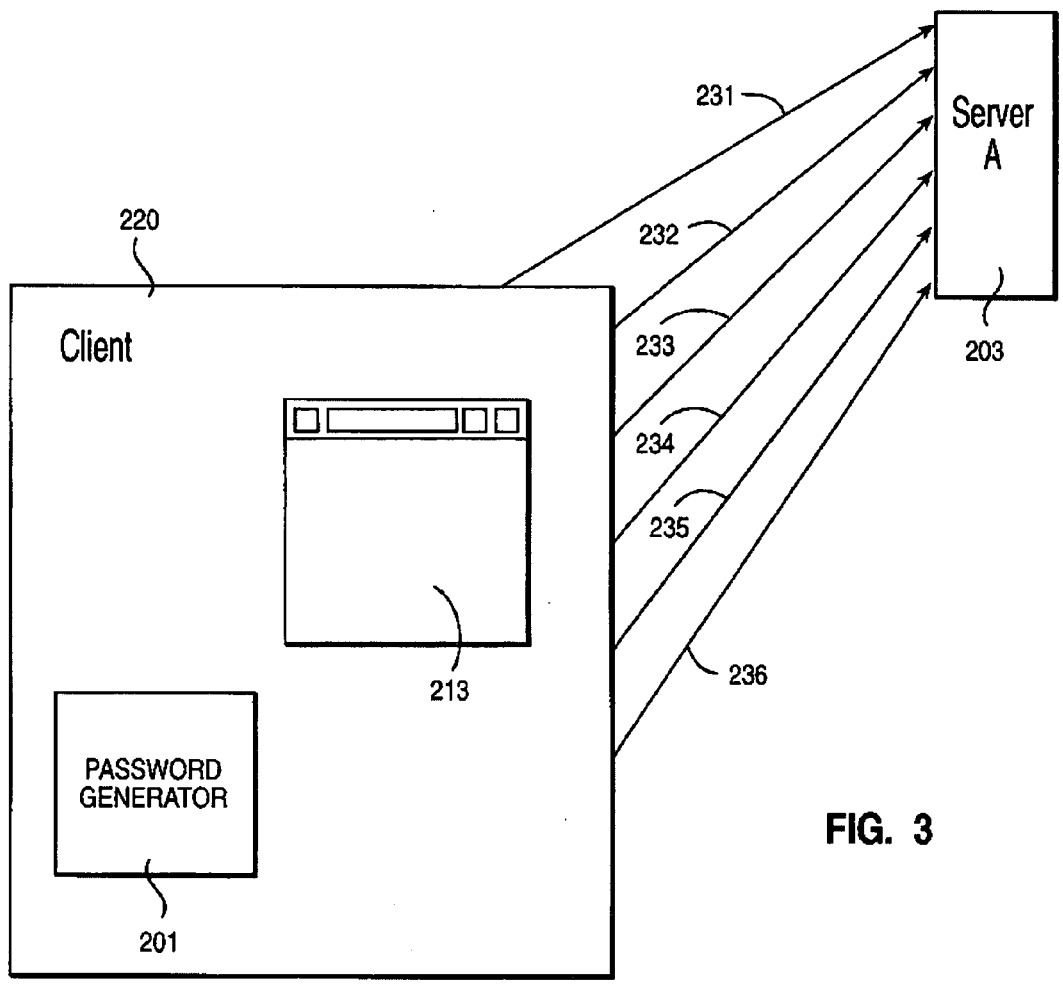
FIG. 3 is a block diagram illustrating the generation, over time, of multiple passwords for a resource due to password expiration in accordance with a preferred embodiment of the invention.

As shown in FIG. 3, the password generator 201 of the present invention not only generates a unique password for each resource, but it also generates a plurality of unique passwords for each resource for the user; such as unique passwords 231–236 for a resource on Server A 203. The plurality of unique passwords are generated in order to provide another password when the current password expires. The plurality of passwords are confined to a set of a fixed number of passwords, for example, a set of six passwords. As such, when a password expires, a next password in the set of passwords is generated. As each password expires, the next password in the set is generated. The same set of passwords continue to be used as the individual passwords within the set are utilized again after all of the other passwords in the set have been used.

Figure 4:
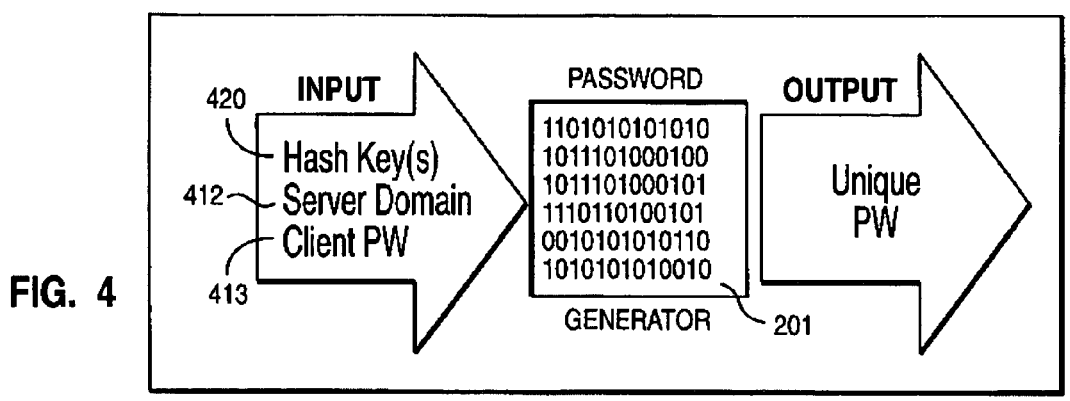
FIG. 4 illustrates the input and output of the password generator in accordance with a preferred embodiment of the invention.

With reference to FIG. 4, the tool, i.e., password generator 201, receives as input a resource name, such as a domain name of the Internet site, for which a password is being needed, 412. The domain name may be, for example, nytimes.com or wsj.com. It should be noted that domain names are inherently unique which helps insure the uniqueness of the resulting generated password. Other resource names may be the application name of an application being accessed such as a financial or banking application. The password generator also receives as input a single user password (otherwise referred to herein as a global user password) 413, defined by the user, that is the same for all of the Internet sites and for all resources being accessed through the password generator tool 201. The password generator tool also receives as input a global key or a set of global (hash) key(s) 420 that enable a system to know the number of password iterations, i.e., the nth or ith iteration of a password for a particular Internet site.

The tool of the present invention utilizes a known algorithm for converting strings to integers through secure hash routines. For example, a known secure hash algorithm is disclosed on the World Wide Web at faqs.org/rfca/rfc3174.html. The tool of the present invention uses the domain name string 412 concatenated with the global user password string 413 as the input string to the algorithm. Besides concatenation, other techniques can be used, such as ORing or ANDing the strings together, in order to combine the domain name string and the global user password string together. The hash values 420 that were input by the user are then used in the algorithm to generate an integer from the combined domain name string and the global user password string.

The set of global hash keys 420 (FIG. 4) generates the set of passwords 231–236 shown in FIG. 3. For example, the first time that a first password 231 is generated for a site, it is the first iteration. When the first password 231 expires, a second password 232 is generated which is referred to herein as the second iteration. The third iteration occurs when the second password 232 expires and a third password 233 is generated, and so on. If there are only six global keys in the set, then after the sixth password 236 expires, the cycle returns to the first iteration and the first password 231 is regenerated using the first global key. This allows a password from a set of passwords to be used again at a later time for the same single resource, such as a resource at server A 203.

Typically, for many resources, when a password expires, the user cannot use the same password that was previously used some given number of iterations before. Typically, a resource does not keep track of every password that was ever used, so a user can reuse passwords that were previously used several password iterations before. Most resources do not keep track for more than six password iterations. Other resources may only keep track of the immediately preceding password that was used.

As such, the tool keeps track of which iteration for password generation the tool is on for a given resource and can use the corresponding global key for that password and then cycle through the other global keys and iterations accordingly. A unique password can still be generated for each iteration while using only the user's single password for each resource by using a separate global (hash) key for each iteration. It should be noted that the same global key for a given iteration is the same regardless of which secure resource is being accessed.

In a preferred embodiment, the global keys are unique numbers (such as high prime numbers) that help define optimal and unique sequences. In yet a further embodiment, the single global user password is not utilized. Instead, the generated passwords are based solely on the domain name and the corresponding global keys that the user has provided as input.

It should be further noted that the global keys are not provided by the tool, but instead, are provided as input by the user. In this way, the same tool can generate unique passwords for each user. Different users can use a same machine running this same tool while still maintaining separate secure access to resources.

As such, a unique password is generated that is not server aware or domain aware. That is, a server or domain does not access the password such as through a password stored in a cookie, or through other session management tools. The password is not stored at the client, rather it is generated each time that a password is required. Each time a same resource is accessed the same password for the resource is able to be regenerated, unless the password has just expired and the next iteration of a password for that resource is being generated.

Furthermore, for some embodiments the tool may also receive a format code such as F1, F2, F3, etc. This format code tells the tool that the resulting generated hashed password must be forced to conform to a certain format. For example, some resources require that a password start with a non-numeric character. The tool would then insert a letter, such as "B", before whatever password was generated. For the next iteration, the tool may insert the letter "C" to conform to the format so that the password does not contain the same beginning letter as the previous password. Other formats may require only a limited number of alphanumeric characters. The tool would then apply an algorithm to the generated password to conform to the format. In some embodiments, a format code may represent one password format requirement. In other embodiments, a single format code may represent more than one format requirement, such as the requirements to be no more than eight alphanumeric characters and to begin with a non numeric character.

More specifically, in a preferred embodiment, the resulting integer generated from the domain name string and the global user password string using the hash keys input by the user is made up of four bytes. If a double is used, there are eight bytes, or sixty-four bits. Five bits will give sixty-four combinations providing up to twelve password characters. Each password character value is mapped to an alphanumeric sequence where 1–26->a–z

27–52->A–Z

53–62->0–9

A resource can specify a password format by requiring that one or more password characters have specifically an alphabet, a numeric, or any alphanumeric value. For example, where Alpha is used hereinafter for alphabet and # is used hereinafter for numeric, formats can be specified such as:

| Alpha, # | mod 62 |
| # | (mod 10) + 52 |
| Alpha | (mod 52) |

The tool generates a unique password for each domain being accessed by the user by using the domain name, the user's global password, and a hash value, referred to herein as a global key. As such each user has a unique password for each domain. Consequently, if security is breached at one domain, the user's passwords for the other domains are not compromised. As such, the user remains protected for other domains even if a password is detected over a wire or link to one of the domains.

Furthermore, the user maintains an "n" number of global keys to enable the tool to cycle through a same set of "n" number of uniquely generated passwords. This allows a user to maintain one single global password although over time a multiple number of unique passwords will be used for a single domain for that user. For example, some resources go back six passwords before the resource allows a previously used password. As such, a preferred embodiment of the invention allows for six global keys to be used for six iterations for a given resource. Other embodiments may utilize a different number of global keys for a different number of iterations for generating a new password for a same resource.

Figure 5A:
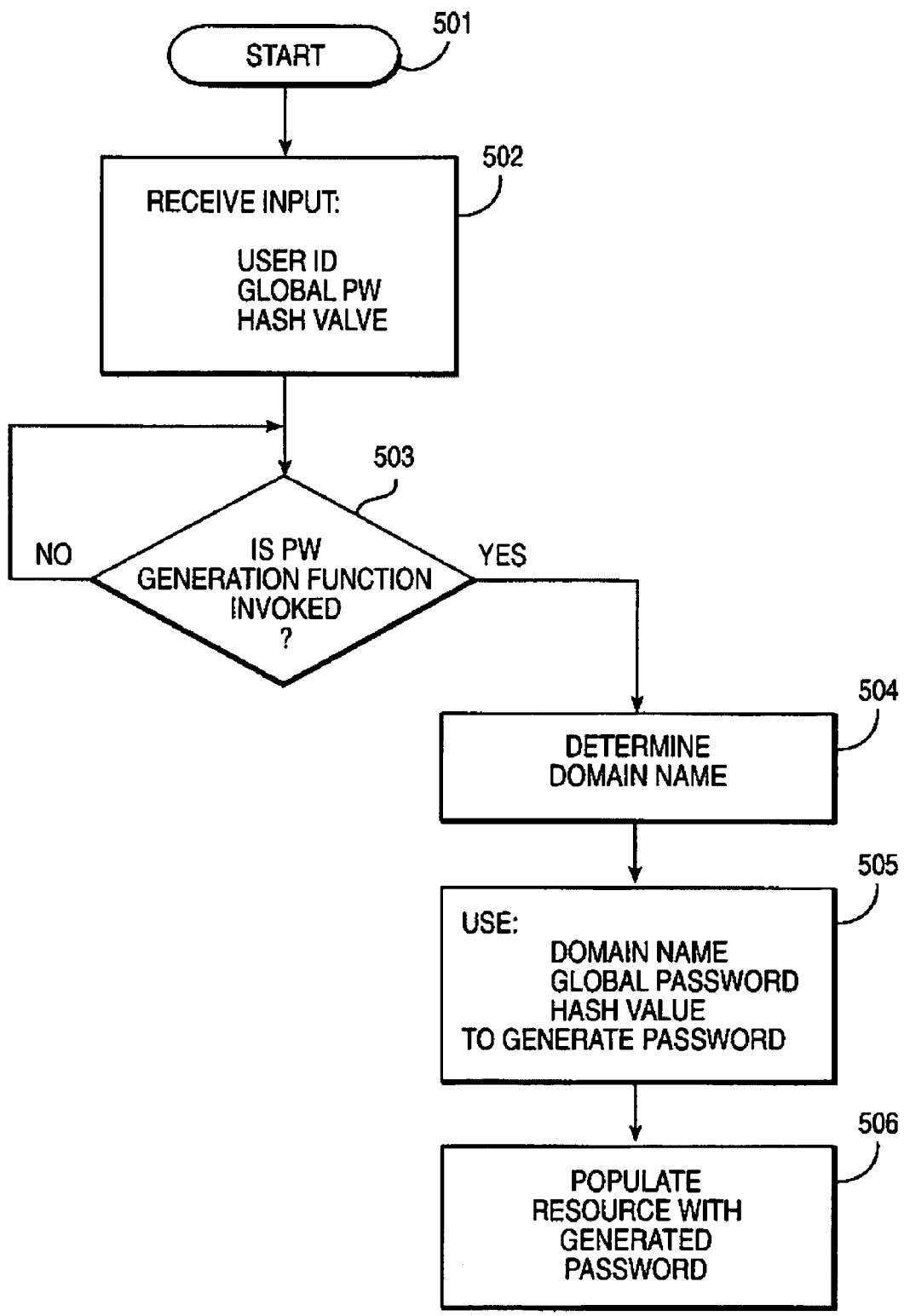
FIG. 5A illustrates the process flow and logic of a preferred embodiment of the invention.

FIG. 5A illustrates a process flow and logic of a preferred embodiment of the invention. The process begins at step 501, when a user invokes the tool of the present invention during a given computing session on a computer on which the tool is executing. The tool receives as user input the user's user ID, the user's global password, and the set of global keys or hash values, 502. In a preferred embodiment, the tool receives the user input each time the user uses the client for a different computing session to minimize any non volatile storage requirements of the tool. In other embodiments, the set of hash values are stored for a particular user by user id and global user password. When a user accesses the tool, the user would then only have to input the user's user ID and global password. The tool would then have access to the set of hash values stored for that user.

Then, when a user accesses a resource, such as a domain, that is requesting a user ID and password, the user invokes the password generation function of the tool. For example, the user may select a button within a user interface of the tool running in a separate frame or window on the user's system. If the password generation function is invoked 503, the tool determines the resource domain name 504 being accessed; and uses the domain name, the global user pass-

| F1 | Alpha | # | # | Alpha | Alpha | Alpha | Alpha | Alpha |
| F2 | # | # | # | # | # | # | # | # |
| . | | | | | | | | |
| . | | | | | | | | |
| . | | | | | | | | |
| F8 | # | Alpha | Alpha | Alpha | Alpha | Alpha | Alpha | Alpha |

The tool of the present invention can force the format of the resulting double integer generated by the tool by utilizing the following:

word, and the hash value to generate a password 505. The tool then populates the resource with the generated password 506.

Figure 5B:
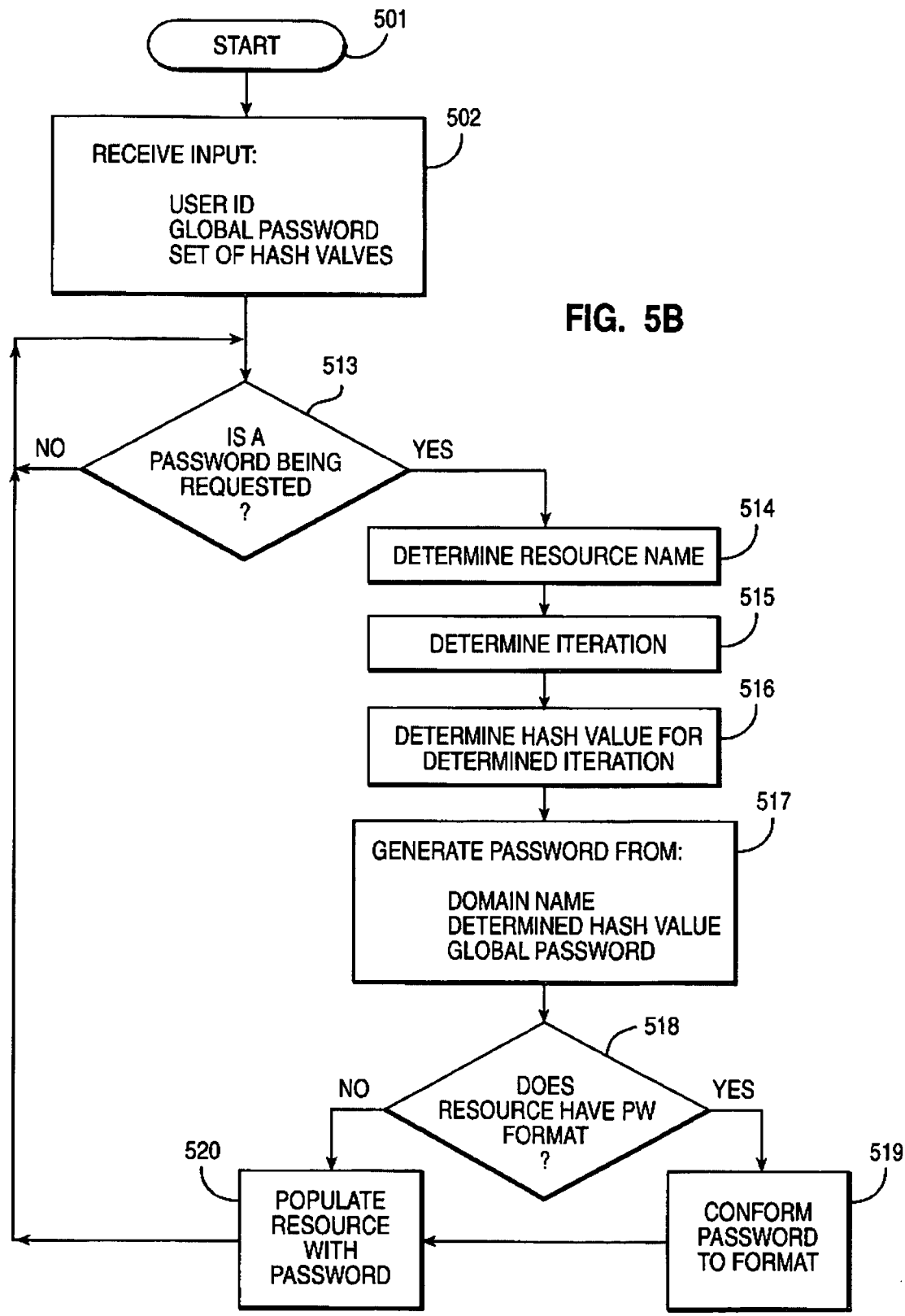
FIG. 5B illustrates the process flow and logic of a preferred embodiment of the invention.

FIG. 5B illustrates a process flow and logic of yet another embodiment of the invention. After receiving the user's initial input 502, the tool automatically recognizes when a password is being requested 513. The tool determines the domain or resource name 514. When the domain is determined, the tool may access a database 600 (FIG. 6) that the tool has built in order to determine the iteration 612 of password generation that the tool has undertaken for the determined domain name 611. Referring back to FIG. 5B, once the iteration for that domain is determined 515, the corresponding hash value in the sequence of hash values for that iteration are determined 516. The tool generates the password from the domain name, the determined hash value, and the global user password 517. The tool determines whether the resource has a required format for the password 518 such as by examining format field 613 in database 600 for that resource 611 (FIG. 6). If it does, then the tool forces the generated password to conform to the format. The process continues such that the tool then automatically populates the domain with the generated password for that domain and for that iteration of the password 520.

If the user returns to the resource during another session and the resource requests a password, the tool is selected and the tool automatically regenerates the same password that was previously used for the previous session. If the resource informs the user that the current password has expired, and that a new password is required, the user selects the tool and indicates in the user interface of the tool that the next hash value for the next iteration is to be used in generating the password. The tool will continue to use the hash value for the iteration when generating a password until the user indicates a next iteration is to be used.

In one implementation of this invention, the tool can be installed on a remote device as described in co-pending U.S. application Ser. No. 10/042,095. For further security, it may be desirable for the user to utilize the user's user ID and/or global password as a sign on to get access to the remote device or to get access to the tool thereon. The tool may also have stored therein a user profile having the set of global values, i.e., hash values. As such, instead of using a remote device to store a large number of passwords for all of the resources utilized by the user, the remote device would merely contain the tool that could generate the needed password on demand.

The exemplary embodiments shown in FIGS. 1–6 are provided solely for the purposes of explaining the preferred embodiments of the invention; and those skilled in the art will recognize that numerous variations are possible, both in form and function. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A method for generating a password for a user for access to an Internet site having a domain name, comprising:
receiving as input a user global password, a user ID, and a set of hash keys;
determining a domain name of the Internet site;
determining an iteration of password renewal for the Internet site;
determining a corresponding hash key to the determined iteration; and
generating the password based upon the global user password, the domain name, and the corresponding hash key wherein the generated password is regenerated during a next communication session with the Internet site by the user.

2. The method of claim 1 further comprising automatically populating the Internet site with the generated password and the user ID.

3. The method of claim 1 further comprising determining if the Internet site has a format requirement for the password; and conforming the generated password to the format requirement in a consistent manner whereby the conformed generated password is regenerated during a next communication session with the Internet site by the user.

4. A computer program on a computer usable medium having computer readable program code means for generating a password for a user for access to an Internet site having a domain name, comprising:
means for receiving as input a user global password, a user ID, and a set of hash keys;
means for determining a domain name of the Internet site;
means for determining an iteration of password renewal for the Internet site;
means for determining a corresponding hash key to the determined iteration; and
means for generating the password based upon the global user password, the domain name, and the corresponding hash key wherein the generated password is regenerated during a next communication session with the Internet site by the user.

5. The computer program of claim 4 further comprising means for determining if the Internet site has a format requirement for the password; and conforming the generated password to the format requirement in a consistent manner whereby the conformed generated password is regenerated during a next communication session with the Internet site by the user.

6. The computer program of claim 4 further comprising means for automatically populating the Internet site with the generated password and the user ID.

7. A computer system having means for generating a password for a user for access to an Internet site having a domain name, comprising:
means for receiving as input a user global password, a user ID, and a set of hash keys;
means for determining a domain name of the Internet site;
means for determining an iteration of password renewal for the Internet site;
means for determining a corresponding hash key to the determined iteration; and
means for generating the password based upon the global user password, the domain name, and the corresponding hash key wherein the generated password is regenerated during a next communication session with the Internet site by the user.

8. The computer system of claim 7 further comprising means for determining if the Internet site has a format requirement for the password; and conforming the generated password to the format requirement in a consistent manner whereby the conformed generated password is regenerated during a next communication session with the Internet site by the user.

9. The computer system of claim 7 further comprising means for automatically populating the Internet site with the generated password and the user ID.

* * * * *